(12) United States Patent
Hammond

(10) Patent No.: US 9,555,361 B2
(45) Date of Patent: Jan. 31, 2017

(54) METHOD AND COMPOSITIONS FOR CAPTURING CARBON DIOXIDE

(71) Applicant: CCM RESEARCH LIMITED, Moreton in Marsh, Gloucestershire (GB)

(72) Inventor: Peter Hammond, Hailey (GB)

(73) Assignee: CCM Research Limited, Gloucestershire (GB)

( * ) Notice: Subject to any disclaimer, the term of this patent is extended or adjusted under 35 U.S.C. 154(b) by 8 days.

(21) Appl. No.: 14/424,997

(22) PCT Filed: Aug. 29, 2013

(86) PCT No.: PCT/GB2013/052262
§ 371 (c)(1),
(2) Date: Feb. 27, 2015

(87) PCT Pub. No.: WO2014/033456
PCT Pub. Date: Mar. 6, 2014

(65) Prior Publication Data
US 2015/0209713 A1  Jul. 30, 2015

(30) Foreign Application Priority Data

Aug. 29, 2012 (GB) .................................. 1215379.7
Aug. 29, 2012 (GB) .................................. 1215380.5

(51) Int. Cl.
*B01D 53/02* (2006.01)
*C05F 11/00* (2006.01)
(Continued)

(52) U.S. Cl.
CPC ............... *B01D 53/02* (2013.01); *B01D 53/62* (2013.01); *B01J 20/24* (2013.01);
(Continued)

(58) Field of Classification Search
CPC ................... B01D 2253/20; B01D 2253/202; B01D 2253/25; B01D 2257/504; B01D 53/02; B01D 53/62; B01J 20/24; B01J 20/28023; B01J 20/3212; B01J 20/3251; B01J 20/3425; B01J 20/3483; C05F 11/00; Y02C 10/04; Y02C 10/08; Y02E 50/343; Y02P 20/152
See application file for complete search history.

(56) References Cited

U.S. PATENT DOCUMENTS

| 1,490,774 A | 4/1924 | Harnist |
| 2,142,965 A | 1/1939 | Hale |

(Continued)

FOREIGN PATENT DOCUMENTS

| CN | 101804327 A | 8/2010 |
| DE | 10053359 A1 | 5/2002 |

(Continued)

OTHER PUBLICATIONS

International Preliminary Report on Patentability for PCT/GB2013/052264, issued Mar. 3, 2015 (6 pages).
(Continued)

*Primary Examiner* — Christopher P Jones
(74) *Attorney, Agent, or Firm* — Hoffman Warnick LLC

(57) ABSTRACT

A method of capturing carbon dioxide, the method comprising the steps of: (a) providing a cellulosic material which carries an amino compound; and (b) contacting the cellulosic material with a composition comprising carbon dioxide; wherein a portion of the heat energy produced in step (b) is captured.

7 Claims, 1 Drawing Sheet

(51) Int. Cl.
  *B01J 20/28* (2006.01)
  *B01D 53/62* (2006.01)
  *B01J 20/24* (2006.01)
  *B01J 20/32* (2006.01)
  *B01J 20/34* (2006.01)

(52) U.S. Cl.
  CPC ..... *B01J 20/28023* (2013.01); *B01J 20/3212* (2013.01); *B01J 20/3251* (2013.01); *B01J 20/3425* (2013.01); *B01J 20/3483* (2013.01); *C05F 11/00* (2013.01); *B01D 2253/20* (2013.01); *B01D 2253/202* (2013.01); *B01D 2253/25* (2013.01); *B01D 2257/504* (2013.01); *Y02C 10/04* (2013.01); *Y02C 10/08* (2013.01); *Y02E 50/343* (2013.01); *Y02P 20/152* (2015.11)

(56) References Cited

U.S. PATENT DOCUMENTS

| | | | | |
|---|---|---|---|---|
| 3,712,025 | A * | 1/1973 | Wallace | B01D 53/326 423/226 |
| 4,259,147 | A | 3/1981 | Gordy | |
| 6,106,593 | A * | 8/2000 | Golden | B01D 53/0462 95/120 |
| 8,414,853 | B2 * | 4/2013 | Liu | B01D 53/18 261/94 |
| 8,545,781 | B1 * | 10/2013 | Yaumi | B01J 20/3204 252/184 |
| 8,715,393 | B2 * | 5/2014 | Wright | 210/673 |
| 8,734,571 | B2 * | 5/2014 | Golden | B01D 53/0462 95/106 |
| 2008/0102502 | A1 | 5/2008 | Foody et al. | |
| 2011/0203311 | A1 | 8/2011 | Wright et al. | |
| 2011/0293493 | A1 | 12/2011 | Johnston et al. | |
| 2012/0076711 | A1 | 3/2012 | Gebald et al. | |
| 2012/0125062 | A1 | 5/2012 | Blandy | |
| 2012/0304858 | A1 * | 12/2012 | Wright | B01D 53/025 95/95 |
| 2015/0239786 | A1 | 8/2015 | Hammond | |

FOREIGN PATENT DOCUMENTS

| | | |
|---|---|---|
| EP | 2532410 A1 | 12/2012 |
| GB | 194289 | 5/1924 |
| GB | 422061 | 1/1935 |
| GB | 2473737 A | 3/2011 |
| WO | 2010091831 A1 | 8/2010 |

OTHER PUBLICATIONS

International Search Report and Written Opinion for International Application No. PCT/GB2013/052262, mailed Dec. 6, 2013 (10 pages).

Search Report for Patent Application No. GB1215379.7, dated Aug. 22, 2013 (1 page).

Search Report for Patent Application No. GB1215380.5, dated Jul. 8, 2013 (2 pages).

International Search Report and Written Opinion for PCT/GB2013/052264, mailed Dec. 10, 2013 (8 pages).

International Preliminary Report on Patentability for PCT/GB2013/052262, issued Mar. 3, 2015 (7 pages).

Office Action for U.S. Appl. No. 14/424,998, dated Mar. 17, 2016, 26 pages.

* cited by examiner

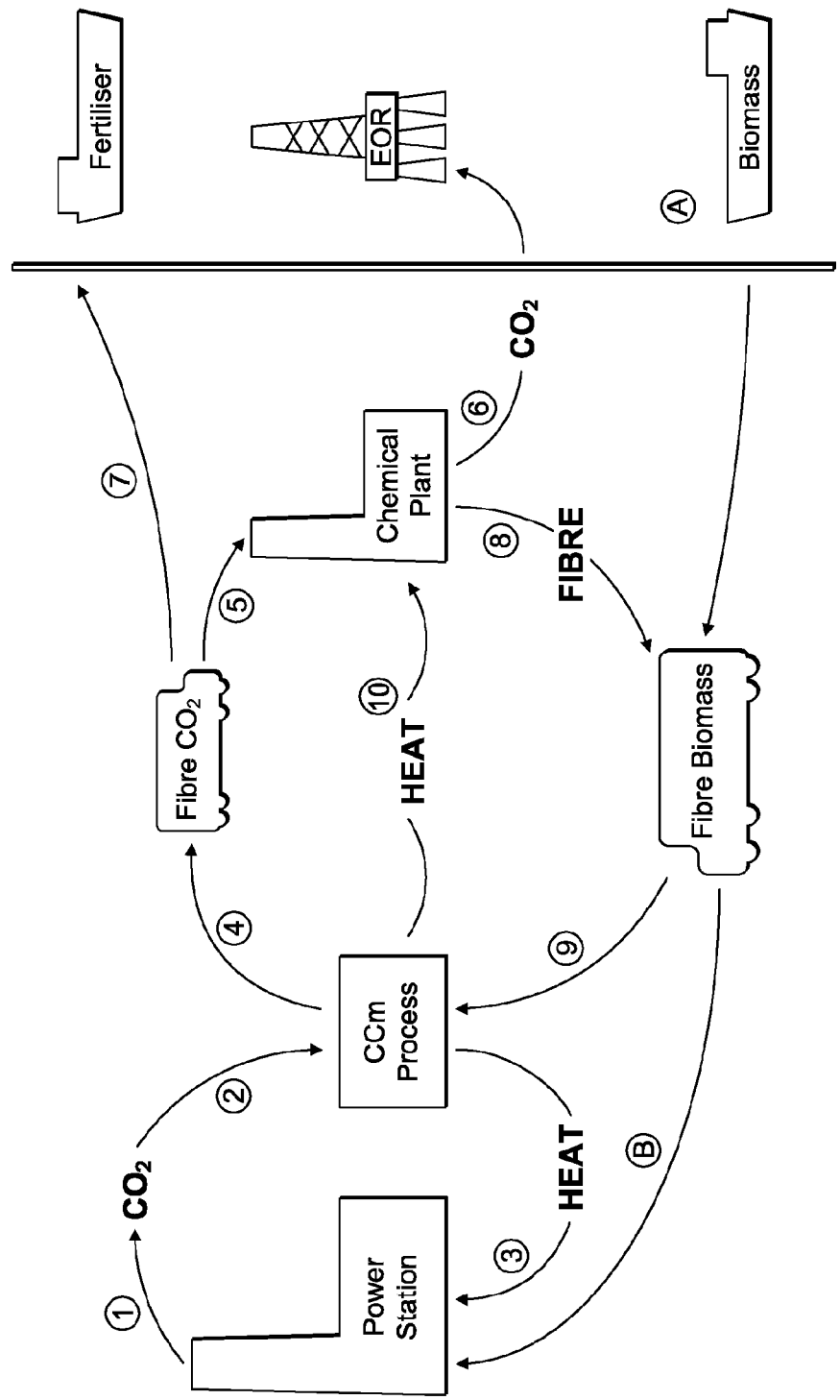

METHOD AND COMPOSITIONS FOR CAPTURING CARBON DIOXIDE

CROSS-REFERENCE TO RELATED APPLICATIONS

This application is the US National Stage of International Patent Application No. PCT/GB2013/052262, filed 29 Aug. 2013, which claims priority to UK Patent Application Nos. 1215379.7 and 1215380.5, both filed 29 Aug. 2012, each of which is hereby incorporated herein as though fully set forth.

The present invention relates to methods for capturing carbon dioxide. The method is exothermic and the heat generated can be well utilised.

For environmental reasons there is an increasingly urgent need to reduce emissions of carbon dioxide into the atmosphere. It is also very beneficial to provide means for removing carbon dioxide from the atmosphere.

Existing methods for capturing carbon dioxide from the atmosphere typically use liquid amines or amine compounds supported on an inorganic material. Known carbon capture methods usually involve capture of carbon dioxide and then subsequent release and collection of the gas. The step of driving gas off from the amine after capture requires significant energy input thereby limiting the environmental benefits.

The present invention provides a method of capturing carbon dioxide which can be included in a highly efficient process to significantly improve the efficiency of a power station.

According to a first aspect of the present invention there is provided a method of capturing carbon dioxide, the method comprising the steps of:

(a) providing a cellulosic material which carries an amino compound; and (b) contacting the cellulosic material with a composition comprising carbon dioxide; wherein a portion of the heat energy produced in step (b) is captured.

The method involves providing a cellulosic material. Suitable cellulosic materials include natural cellulosic materials and semi-synthetic or processed cellulosic materials.

In some preferred embodiments the cellulosic material used in the method of the present invention is a fibrous material. The cellulosic material may comprise natural fibres and/or synthetic fibres and/or semi-synthetic fibres, for example regenerated cellulose products. Suitable synthetic fibres include polyamides, polyesters and polyacrylics. Preferably the material comprises natural fibres.

Preferably the cellulosic material is a natural cellulosic material.

The use of natural fibres may improve the environmental profile of the method of the present invention.

Preferably step (a) of the method of the present invention comprises providing cellulosic fibres which carry an amino compound.

Suitable natural cellulosic fibres for use herein include cotton, hemp, flax, silk, jute, kenaf, ramie, sisal, kapok, agave, rattan, soy bean, vine, banana, coir, stalk fibres and mixtures thereof.

In some preferred embodiments the cellulosic material comprises a waste product or a byproduct from agriculture. Such cellulosic materials would otherwise have little or no value in other applications. Suitable waste products or by-products may be the stems, leaves, chaff or husks of crops, for example cereals or rapeseed. Most preferably the cellulosic material is straw or wood pulp.

In some embodiments the cellulosic material may be refined wood pulp, for example the material sold under the trade mark TENSEL.

In some embodiments the cellulosic material may be the waste directly obtained from pulp mills, for example pine pulp.

In some embodiments the cellulosic material may be a straw material obtained from cereals, for example wheat, rye or barley.

The cellulosic material is suitably provided as a finely divided particulate material. Suitably the cellulosic material has an average particle size of at least 10 microns, preferably at least 50 microns, more preferably at least 100 microns. The cellulosic material may have an average particle size of at least 0.2 mm, preferably at least 0.5 mm. The cellulosic material may have an average particle size of up to 10 cm, suitably up to 5 cm, preferably up to 1 cm, more preferably up to 0.5 cm.

In especially preferred embodiments the cellulosic material has an average particle size of from 0.5 to 3 mm.

Average particle size may suitably be measured by conventional sieving techniques.

Step (a) of the method of the present invention involves providing a cellulosic material which carries an amino compound. Suitably the cellulosic material is contacted with a composition comprising an amino compound such that the amino is retained on the surface of the cellulosic material.

Suitably an interaction occurs between the surface of the material and the amino compound. Any type of interaction may occur and depends on the particular amino compound and the material involved. For example a simple electrostatic interaction may occur, dipole-dipole interactions may occur, hydrogen bonding may occur, or a full covalent bond may be formed between the amino compound and the surface of the material. Without being bound by theory, it is believed that hydrogen bonding occurs between the amino functionality and the surface.

Step (a) may suitably comprise contacting the cellulosic material with a composition comprising an amino compound. The amino compound may be selected from any compound containing an amino or substituted amino moiety, for example ammonia, an aliphatic or aromatic amine, an amide or urea. Preferably the amino compound is selected from ammonia or an amine.

In some preferred embodiments the amino compound comprises ammonia. By this we mean to include ammonium hydroxide, i.e. an aqueous ammonia composition.

Suitable amino compounds include natural compounds and synthetic compounds. A mixture of two or more amino compounds may be used.

Suitable amines include aromatic and aliphatic amines. These amines may be substituted or unsubstituted. Examples of suitable amines include amino acids, alkanolamines, alkyl amines and alkenyl amines. Especially preferred amines for use herein are alkyl amines and alkanolamines.

The amino compound may be selected from ammonia, a primary amine, a secondary amine or a tertiary amine. Some preferred amines for use in step (a) of the present invention are primary amines, secondary amines, or mixtures thereof. Some especially preferred amines for use herein are primary or secondary alkyl amines, especially alkyl amines having up to 12 carbon atoms, more preferably up to 4 carbon atoms. Preferred amines for use herein include methylamine, dimethylamine, ethylamine, diethylamine, propylamine, dipropylamine, butylamine, dibutylamine and mixtures and isomers thereof.

Some especially preferred amino compounds are alkanolamines. Examples of suitable alkanolamines include ethanolamine, 2-(methylamino)ethanol, diethanolamine, 2-amino-2-methyl-1-propanol and diisopropanolamine. One particularly preferred compound is 2-amino-2-methyl-1-propanol.

Suitably the amino compound is a compound of formula $R^1R^2R^3N$ wherein each of $R^1$, $R^2$, and $R^3$ is independently selected from hydrogen, an alkyl group and a group of formula HO—X— where X represents an alkylene group. Preferably each of $R^1$, $R^2$, and $R^3$ is independently selected from hydrogen, an alkyl group having 1 to 10 carbon atoms, and a group of formula HO—X— where X represents an alkylene group having 1 to 10 carbon atoms. Preferably each of of $R^1$, $R^2$, and $R^3$ is independently selected from hydrogen, an alkyl group having 1 to 4 carbon atoms, and a group of formula HO—X— where X represents an alkylene group having 1 to 4 carbon atoms.

In some embodiments the composition may comprise one or more natural amino compounds. Such compounds may be found in or derived from waste material, for example human or animal urine. The use of amines derived from waste materials, for example human or animal urine may help improve the environmental profile of the method of the present invention.

The composition contacted with the cellulosic material may comprise a neat concentrated amino compound in gaseous or liquid form or it may comprise one or more further components, for example a diluent or carrier. Preferably the composition is a liquid composition.

In some preferred embodiments the amino compound is an amine, for example a primary, secondary or tertiary amine. In such embodiments step (a) suitably comprises contacting the cellulosic material with a composition comprising at least 10 wt % amino compound, suitably at least 40 wt %, preferably at least 60 wt % or at least 70 wt %.

The above amounts refer to the total of all amino compounds present in the composition.

Preferably the composition containing an amine contains at least 5 wt % water, preferably at least 10 wt % water, most preferably at least 15 wt % water.

In some especially preferred embodiments the composition comprises from 75 to 85 wt % of an amine and from 15 to 25 wt % water.

In some preferred embodiments the amino compound is ammonia or ammonium hydroxide. In such embodiments step (a) suitably comprises contacting the cellulosic material with a composition comprising at least 1 wt % ammonium hydroxide, suitably at least 5 wt %, preferably at least 10 wt % or at least 15 wt %.

Preferably the composition containing ammonium hydroxide comprises at least 10 wt % water, preferably at least 30 wt % water, most preferably at least 50 wt % water, for example at least 60 wt %.

In some especially preferred embodiments the composition comprises from 20 to 30 wt % of ammonium hydroxide and from 70 to 80 wt % water.

In step (a) the cellulosic material is suitably contacted with a composition comprising an amino-compound wherein the weight ratio of the amino composition to cellulosic material is preferably at least 0.1:1, preferably at least 0.5:1, more preferably at least 1:1.

Suitably in step (a) the weight ratio of amino containing composition contacted with the cellulosic material is up to 100:1 (amino composition:material), preferably up to 50:1, more preferably up to 20:1, for example up to 15:1.

In some especially preferred embodiments in step (a) the cellulosic material is contacted with from 1.5 to 5, preferably from 2 to 3 parts by weight of a composition comprising an amino-compound.

In some preferred embodiments in step (a) the cellulosic material is contracted with from 15 to 20, preferably from 10 to 15 parts by weight of a composition comprising an amino compound.

Step (b) of the present invention involves contacting the cellulosic material with a composition comprising carbon dioxide.

In some embodiments the material may be contacted with neat carbon dioxide. This may be provided as carbon dioxide gas, as supercritical carbon dioxide or as solid carbon dioxide. In preferred embodiments the carbon dioxide is in gaseous form.

In preferred embodiments the composition used in step (b) comprises a gaseous composition comprising at least 1 wt % carbon dioxide. Preferably composition contacted with the material in step (b) is a gaseous composition comprising at least 5 wt % carbon dioxide, more preferably 10 wt % carbon dioxide, still more preferably at least 15 wt % carbon dioxide. In some embodiments step (b) involves treating the material with a composition comprising at least 50 wt % carbon dioxide, for example at least 75 wt %, at least 90 wt % or at least 95 wt %.

In some embodiments the composition used in step (b) may comprise purified exhaust gases from the combustion of fossil fuels. For example carbon dioxide may be captured from exhaust gases using a method of the prior art, released and used in step (b) of the method of the present invention. In such embodiments the composition suitably comprises at least 80 wt % carbon dioxide, for example at least 90 wt %, at least 95 wt % or at least 98 wt %.

In some embodiments the composition contacted with the material may further comprise sulfur dioxide.

In some embodiments the composition comprises a carbon dioxide and sulfur dioxide. It may comprise other components, suitably other gaseous components, for example nitrogen.

In some preferred embodiments the composition contacted with the material in step (b) comprises or is derived from the exhaust gas of a combustion system. For example the composition may be obtained from the flue of a power station, for example a wood-burning or coal-burning power station.

In some embodiments such exhaust gases may be concentrated or otherwise treated prior to contact with the material.

In especially preferred embodiments the composition comprising carbon dioxide is provided by the exhaust of a fossil fuel burning engine, boiler, furnace or turbine.

A particular advantage of the method of the present invention is that it can be used to directly capture carbon dioxide from the flue gases of a power station.

In some embodiments the composition of the present invention comprises from 1 to 50 wt % carbon dioxide, preferably from 10 to 35 wt %, suitably from 15 to 25 wt %, for example from 17 to 22 wt %.

The composition used in step (b) may comprise at least 0.1 wt % sulfur dioxide, preferably at least 0.5 wt %, for example at least 1 wt %. It may comprise up to 20 wt % sulfur dioxide, for example up to 10 wt % or up to 7 wt %.

In one embodiments the composition contacted with the material composition in a gaseous composition comprising from 50 to 90 wt %, preferably 60 to 80 wt % nitrogen, from 5 to 40 wt %, preferably 15 to 25 wt % carbon dioxide and up to 20 wt %, preferably up to 10 wt % sulfur dioxide.

In some embodiments in step (b) a gaseous composition may be pumped into a vessel containing the cellulosic material. In some embodiments the cellulosic material may be dry. Alternatively the material may be wet.

In preferred embodiments cellulosic material, suitably dry cellulosic material, is treated with a composition comprising an amine in step (a). This material is preferably directly contacted with a composition comprising carbon dioxide in step (b).

In preferred embodiments there are no rinsing steps between step (a) and step (b).

In preferred embodiments there are no drying steps between step (a) and step (b).

The composition contacted with the cellulosic material in step (b) may be at atmospheric pressure or it may be at higher pressures. The skilled person will appreciate that when elevated pressures are used the contact times needed are generally shorter than when lower pressures are used.

In some embodiments the composition contacted with the material in step (b) may comprise carbon dioxide along with a diluent or carrier. In some embodiments the composition may comprise only carbon dioxide.

In some preferred embodiments the composition contacted with the material in step (b) consists essentially of carbon dioxide, i.e. it is provided from a source of carbon dioxide without the addition of a diluent or carrier. Minor impurities may be present.

In embodiments in which the cellulosic material is contacted with neat carbon dioxide gas this may be provided at a pressure of up to 40,000 kPa, preferably from 100 to 3000 kPa. In some embodiments carbon dioxide may be delivered to the cellulosic material at ambient pressure, and preferably at ambient temperature. In preferred embodiments the carbon dioxide gas is at a supra-atmospheric pressure.

In especially preferred embodiments in which the composition contacted with the material in step (b) comprises flues gases, this is typically at a pressure of from 100 to 500 kPa.

The uptake of carbon dioxide on the cellulosic material is preferably at least 1% omf, preferably at least 5% omf, more preferably at least 10% omf, for example at least 15% omf.

The uptake of carbon dioxide on the cellulosic material may be up to 100% omf, suitably up to 80% omf, preferably up to 60% omf, preferably up to 40% omf, for example up to 30% omf, or up to 25% omf.

By % omf (% on mass of fibre) we mean to refer to the mass of carbon dioxide as a percentage of the mass of fibres contacted with the composition comprising carbon dioxide.

For the avoidance of doubt, the above amounts refer to the increase in weight of the treated cellulosic material, i.e. material that carries an amino compound on its surface.

In the method of the present invention the cellulosic material preferably comprises small particles of cellulosic fibres.

In preferred embodiments the fibres are agitated in step (b). Preferably agitation is achieved by blowing a gaseous composition comprising carbon dioxide through the fibres.

Preferably step (b) of the method of the present invention comprises blowing exhaust gases from the combustion of a fossil fuel through fibres of cellulosic material which carry an amine compound.

A particular advantage of the present invention is that the cellulosic fibres are of much lower density than some amine-based carbon capture materials of the prior art. These fibres also present a greater surface area for contact with gases.

Without being bound by theory it is believed that the fibres used in the present invention are less closely packed than some inorganic materials of the prior art. The fibres used in the present invention are typically porous materials and interact with each other through hydrogen bonding. As a result carbon dioxide is able to flow through channels between fibres and within the fibres themselves.

These fibres can effectively float in a gas stream and behave as a fluid.

The method of the present invention may suitably be carried out using a fluidised bed. These are known to the person skilled in the art.

Preferably the method of the present invention involves a continuous process.

Suitably the composition comprising carbon dioxide is contacted with the cellulosic material for a period of less than 2 hours, preferably less than 10 minutes, more preferably less than 1 minute, for example less than 30 seconds. Typical contact times are 1 to 30 seconds. However in some embodiments longer contact times may be used.

In the method of the present invention a portion of the heat energy produced in step (b) is captured. By this we mean that a portion of the heat that is produced is not lost to the atmosphere. A portion of the heat energy is used in a subsequent process and is not a mere byproduct.

The mechanism by which carbon dioxide is retained on the surface of the cellulosic material in the method of the present invention is not fully understood. However the interaction is exothermic. In the method of the present invention a portion of the heat energy produced in step (b) is captured. The skilled person will appreciate that not all of the heat can be captured and some loss will always occur. Preferably at least 1% of the heat energy produced in step (b) is captured, preferably at least %, more preferably at least 3%, suitably at least 4%, for example at least 5%, at least 6% or at least 7%. Suitably at least 8%, at least 9% or at least 10% of the heat energy produced is captured.

In some embodiments, from 12 to 30% of the heat energy produced is captured, for example from 13 to 20% or about 15%.

In the method of the present invention a portion of the heat energy produced in step (b) is "captured". By this we mean that the heat is not allowed to simply dissipate. Preferably a portion of the heat energy obtained in step (b) is used to heat a material. Preferably it is used to heat a fluid. Preferably it is used to heat a liquid.

In some embodiments a portion of the heat energy obtained in step (b) may be used to heat water. For example it may be used to produce steam. The steam produced is preferably used in power generation.

In especially preferred embodiments a portion of the heat energy produced in step (b) is used to heat a heat transfer fluid. These specialist fluids are commonly used in the power generation industry and are known to the person skilled in the art.

In preferred embodiments a portion of the heat energy produced in step (b) is used in power generation.

Thus the method of the present invention finds particular utility in power stations. Carbon dioxide may be captured from the exhaust gases by a process which releases heat energy that can be used in power generation.

In the method of the present invention significant quantities of captured heat energy may be obtained. For each mega tonne of carbon dioxide captured up to 550 GWh of energy may be captured.

Capturing the heat energy in this way may improve the efficiency of a power station by more than 1%. For example efficiency may be improved by up to 5% or up to 10%.

Even small percentage efficiency savings represent a very significant reduction in energy use in the context of a large power station. This is achieved in addition to the capture of carbon dioxide.

The potential benefits and efficiency savings are further described in the examples.

According to a second aspect of the present invention there is provided a material obtained by the method of the first aspect.

Following step (b) of the method of the present invention the cellulosic material carries an amine and carbon dioxide on the surface. This material may itself be used as a means of storing carbon dioxide.

The present invention may further provide the use of the material of the second aspect for storing carbon dioxide.

In some embodiments the material obtained following step (b) may be used as a fertiliser. It may optionally be treated with one or more further components to provide additional plant nutrients.

The present invention may further provide the use of the material of the second aspect as a fertiliser.

In some especially preferred embodiments the carbon dioxide retained on the surface following step (b) is not readily released from the material under normal storage and transport conditions. Thus the treated cellulosic material is preferably stable at all humidities, at standard atmospheric pressure and at temperatures of between −30° C. and 70° C., for example between −20° C. and 60° C., between −10° C. and 50° C., or between 0° C. and 40° C. The treated cellulosic material is suitably weatherproof and carbon dioxide is not released under normal climatic extremes of heat or cold or in very wet, very dry, windy or stormy environments. The fibres obtained following step (b) of the method of the present invention may therefore be used as a means for transporting carbon dioxide.

The cellulosic material obtained by the method of the present invention may typically comprise about 20% omf of carbon dioxide. This material can be transported in bulk containers without any special conditions being necessary. In contrast, carbon dioxide gas typically needs to be transported in specialist pressurised vehicles, which also need to be cooled. Thus the fibres produced by the present invention may provide a more cost effective and energy efficient way to transport carbon dioxide.

The present invention may further provide the use of the material of the second aspect for transporting carbon dioxide.

A particular advantage of the product obtained following step (b) of the method of the present invention is that the carbon dioxide is reversibly bound to the fibres. Thus carbon dioxide may suitably be released from the fibres at a later time. Suitably carbon dioxide may be released by heating the fibres. The fibres are typically heated to a temperature of at least 70° C., preferably to a temperature of between 80 and 100° C. Heating may suitably be carried out by passing warm gas, for example air, through fibres of the cellulosic material. Suitably when heating the fibres to release carbon dioxide at least 90% of the amine remains on the fibres, suitably at least 95%, preferably at least 98%. This enables the cellulosic fibres carrying the amino compound to be re-used.

Carbon dioxide may be released from the fibres at a convenient time and location. The carbon dioxide may be released in a controlled environment. In some embodiments the carbon dioxide may be released at a regeneration plant. The released carbon dioxide could then be pumped to a long term storage location, for example below the sea. Alternatively it could be used in another industrial process, for example enhanced oil recovery.

In some embodiments a portion of the heat energy produced in step (b) of the method of the present invention may be used to heat other carbon-dioxide carrying fibres to release the carbon dioxide.

Thus in one embodiment the present invention provides a method of capturing carbon dioxide, the method comprising the steps of:

(a) providing a cellulosic material which carries an amino compound;

(b) contacting the cellulosic material with a composition comprising carbon dioxide; and (c) using a portion of the heat energy produced in step (b) to heat fibres previously treated according to step (a) and step (b).

Heating the cellulosic material may suitably release carbon dioxide from the surface of the material. Preferably however the amino compound is retained on the surface during this heating process. Suitably the cellulosic material can then be directly reused in step (a) of the method of the present invention.

The present invention may provide a method of capturing carbon dioxide, the method comprising the steps of:

(a) providing a cellulosic material which carries an amino compound;

(b) contacting the cellulosic material with a composition comprising carbon dioxide;

(c) optionally transporting the material obtained following step (c); and (d) heating the cellulosic material thereby releasing carbon dioxide from the material.

Preferably a portion of the heat energy produced in step (b) is captured. This heat energy may be used in step (d).

The invention will now be further described with reference to FIG. 1.

FIG. 1 shows how the process of the first aspect of the present invention may be central to an integrated process. At the centre the "CCM process" involves steps (a) and (b) of the method of the first aspect of the present invention. In this process (2) cellulosic fibres carrying an amino compound are provided. The cellulosic material may be sourced from waste biomass from agricultural or industrial processes (A). The amino-carrying fibres are treated with the exhaust gases from a power station comprising carbon dioxide (1). This is an exothermic process and the heat produced may be used in the power station (3) or a separate "regeneration" chemical plant (10). The fibres obtained containing captured carbon dioxide can then be easily transported (4). These may be used as fertiliser (7) or delivered to a regeneration plant (5). At the regeneration plant the fibres are suitably heated to release carbon dioxide. Heat may be provided from the "CCM process"—i.e. the method of the first aspect of the present invention (10). The carbon dioxide obtained may be transported for storage or use in industrial applications, for example enhanced oil extraction (6). The cellulosic fibres obtained following release of the carbon dioxide at the regeneration plant can be reused in the CCM process (9) or used as fuel in the power station (B).

The invention will now be further described by reference to the following example:

EXAMPLE 1

60 mL TENSEL® pine fibres were placed in a vessel and 2 parts by mass of ethanolamine were added. The vessel was placed in a water bath comprising a known volume of water. Carbon dioxide was passed through the vessel and the increase in temperature of the water was measured. This equated to the release of 15 kJ of energy. On scale up, 1 m$^3$ of fibre would provide 70 kWh of power.

The invention claimed is:

1. A method of capturing carbon dioxide, the method comprising the steps of:
    (a) providing a cellulosic material which carries ammonia; and
    (b) contacting the cellulosic material with a composition comprising carbon dioxide, producing heat energy;
    wherein a portion of the heat energy produced in step (b) is captured.

2. A method according to claim 1 wherein the cellulosic material is a fibrous material.

3. A method according to claim 1 wherein the composition contacted with the material in step (b) comprises or is derived from exhaust gas of a combustion system.

4. A method according to claim 1 wherein an uptake of carbon dioxide on the cellulosic material is at least 10% omf.

5. A method of capturing carbon dioxide, the method comprising the steps of:
    (a) providing a cellulosic material which carries ammonia;
    (b) contacting the cellulosic material with a composition comprising carbon dioxide, producing heat energy; and
    (c) using a portion of the heat energy produced in step (b) to heat fibres previously treated according to step (a) and step (b).

6. A method of capturing carbon dioxide, the method comprising the steps of:
    (a) providing a cellulosic material which carries ammonia;
    (b) contacting the cellulosic material with a composition comprising carbon dioxide, producing heat energy; and
    (c) heating the cellulosic material thereby releasing carbon dioxide from the material;
    wherein a portion of the heat energy produced in step (b) is captured.

7. The method of claim 6, further comprising:
    transporting the material between steps (b) and (c).

* * * * *